United States Patent
Seo et al.

(10) Patent No.: US 8,570,711 B2
(45) Date of Patent: Oct. 29, 2013

(54) MULTILAYERED CERAMIC ELECTRONIC COMPONENT

(75) Inventors: Byung Kil Seo, Gyunggi-do (KR); Byung Sung Kang, Gyunggi-do (KR)

(73) Assignee: Samsung Electro-Mechanics Co., Ltd, Suwon (KR)

( * ) Notice: Subject to any disclaimer, the term of this patent is extended or adjusted under 35 U.S.C. 154(b) by 8 days.

(21) Appl. No.: 13/449,113

(22) Filed: Apr. 17, 2012

(65) Prior Publication Data

US 2013/0050898 A1 Feb. 28, 2013

(30) Foreign Application Priority Data

Aug. 29, 2011 (KR) .................. 10-2011-0086519

(51) Int. Cl.
*H01G 4/06* (2006.01)
(52) U.S. Cl.
USPC ............. 361/321.2; 361/321.1; 361/306.1; 361/306.3; 361/303; 361/312
(58) Field of Classification Search
USPC .............. 361/321.2, 321.1, 301.2, 301.4, 361/303–305, 311–313, 306.1, 306.3
See application file for complete search history.

(56) References Cited

U.S. PATENT DOCUMENTS

| 5,985,414 | A | * | 11/1999 | Fukuda et al. | 428/192 |
| 6,903,919 | B2 | * | 6/2005 | Kayatani et al. | 361/321.2 |
| 8,174,816 | B2 | * | 5/2012 | Seo et al. | 361/321.2 |
| 8,400,753 | B2 | * | 3/2013 | Kim et al. | 361/303 |
| 2009/0067117 | A1 | * | 3/2009 | Kasuya et al. | 361/321.2 |
| 2012/0019982 | A1 | * | 1/2012 | Sasaki | 361/321.1 |

FOREIGN PATENT DOCUMENTS

| JP | 09-162063 A | 6/1997 |
| JP | 2007-294839 A | 11/2007 |

* cited by examiner

*Primary Examiner* — Nguyen T Ha
(74) *Attorney, Agent, or Firm* — McDermott Will & Emery LLP

(57) ABSTRACT

There is provided a multilayered ceramic electronic component including: a ceramic main body having a dielectric layer, the ceramic main body having a length of 1.79 mm or less and a width of 1.09 mm or less; first and second internal electrodes disposed to face each other with the dielectric layer interposed therebetween within the ceramic main body; and a first external electrode electrically connected to the first internal electrode and a second external electrode electrically connected to the second internal electrode, wherein, when it is defined that the shortest length of at least one of the first and second external electrodes, formed in the lengthwise direction from both end portions of the ceramic main body is A, and the longest length thereof is BW, a relational expression of $0.5 \leq A/BW < 1.0$ may be satisfied.

10 Claims, 3 Drawing Sheets

MULTILAYERED CERAMIC ELECTRONIC COMPONENT

CROSS-REFERENCE TO RELATED APPLICATIONS

This application claims the priority of Korean Patent Application No. 10-2011-0086519 filed on Aug. 29, 2011, in the Korean Intellectual Property Office, the disclosure of which is incorporated herein by reference.

BACKGROUND OF THE INVENTION

1. Field of the Invention

The present invention relates to a high voltage multilayered ceramic electronic component capable of significantly restraining arc generation (or an arc strike).

2. Description of the Related Art

Recently, as electronic products have been reduced in size, a multilayered ceramic electronic component has been required to be small while having a large capacity.

Thus, attempts have been made at allowing the dielectric layers and internal electrodes of multilayered ceramic electronic components to be thinner and multi-layered, according to various methods, and recently, multilayered ceramic electronic components have been manufactured to have an increased number of laminated layers by reducing the thickness of dielectric layers.

However, in the case of high voltage products having a relatively high voltage, arcs between both terminals of external electrodes are likely to be generated due to a high voltage applied to the both ends, leading to technical difficulties in reducing the size of products.

In particular, when the size of a product is small, the interval between both terminals of the external electrodes may be reduced, further increasing the possibility of arcs being generated between both terminals.

Thus, the shape of external electrodes is a critical factor for a small, high voltage product.

SUMMARY OF THE INVENTION

An aspect of the present invention provides a high voltage multilayered ceramic electronic component capable of significantly restraining arc generation.

According to an aspect of the present invention, there is provided a multilayered ceramic electronic component including: a ceramic main body including a dielectric layer, first and second main faces opposed in a dielectric layer lamination direction, third and fourth end faces connecting the first and second main faces and opposed in a lengthwise direction, and fifth and sixth side faces connecting the first and second main faces and opposed in a widthwise direction, the ceramic main body having a length of 1.79 mm or less and a width of 1.09 mm or less; first and second internal electrodes disposed to face each other with the dielectric layer interposed therebetween within the ceramic main body; and a first external electrode electrically connected to the first internal electrode and a second external electrode electrically connected to the second internal electrode, wherein, when it is defined that a shortest length of at least one of the first and second external electrodes, formed in the lengthwise direction from both end portions of the ceramic main body is A, and a longest length thereof is BW, a relational expression of $0.5 \leq A/BW < 1.0$ may be satisfied.

One end of each of the respective first and second internal electrodes may be alternately exposed from the third and fourth end faces of the ceramic main body.

The ceramic main body may further include one or more floating electrodes formed to have portions overlapping the first and second internal electrodes, with the dielectric layer interposed therebetween.

When it is defined that the length of the ceramic main body is L and the shortest distance between the first external electrode and the second external electrode is G, a relational expression of $0.75 \leq G/L \leq 0.94$ may be satisfied.

When it is determined that an average thickness of the dielectric layer is td, it may be that $td \geq 10\ \mu m$.

According to another aspect of the present invention, there is provided a multilayered ceramic electronic component including: a ceramic main body including a plurality of dielectric layers, first and second main faces opposed in a dielectric layer lamination direction, third and fourth end faces connecting the first and second main faces and opposed in a lengthwise direction, and fifth and sixth side faces connecting the first and second main faces and opposed in a widthwise direction, the ceramic main body having a length of 1.79 mm or less and a width of 1.09 mm or less; a plurality of first and second internal electrodes disposed to face each other with each of the dielectric layers interposed therebetween within the ceramic main body; and a first external electrode electrically connected to the first internal electrode and a second external electrode electrically connected to the second internal electrode, wherein, when it is defined that a shortest length of at least one of the first and second external electrodes, formed in the lengthwise direction from both end portions of the ceramic main body is A, and a longest length thereof is BW, a relational expression of $0.5 \leq A/BW < 1.0$ may be satisfied.

One end of each of the plurality of first and second internal electrodes may be alternately exposed from the third and fourth end faces of the ceramic main body.

The ceramic main body may further include one or more floating electrodes formed to have portions overlapping the first and second internal electrodes, with the dielectric layers interposed therebetween, and the first and second internal electrodes and the floating electrode may be alternately laminated between the dielectric layers.

When it is defined that the length of the ceramic main body is L and the shortest distance between the first external electrode and the second external electrode is G, a relational expression of $0.75 \leq G/L \leq 0.94$ may be satisfied.

When it is determined that an average thickness of the dielectric layers is td, it may be that $td \geq 10\ \mu m$.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENTS OF THE INVENTION

Figure 1:
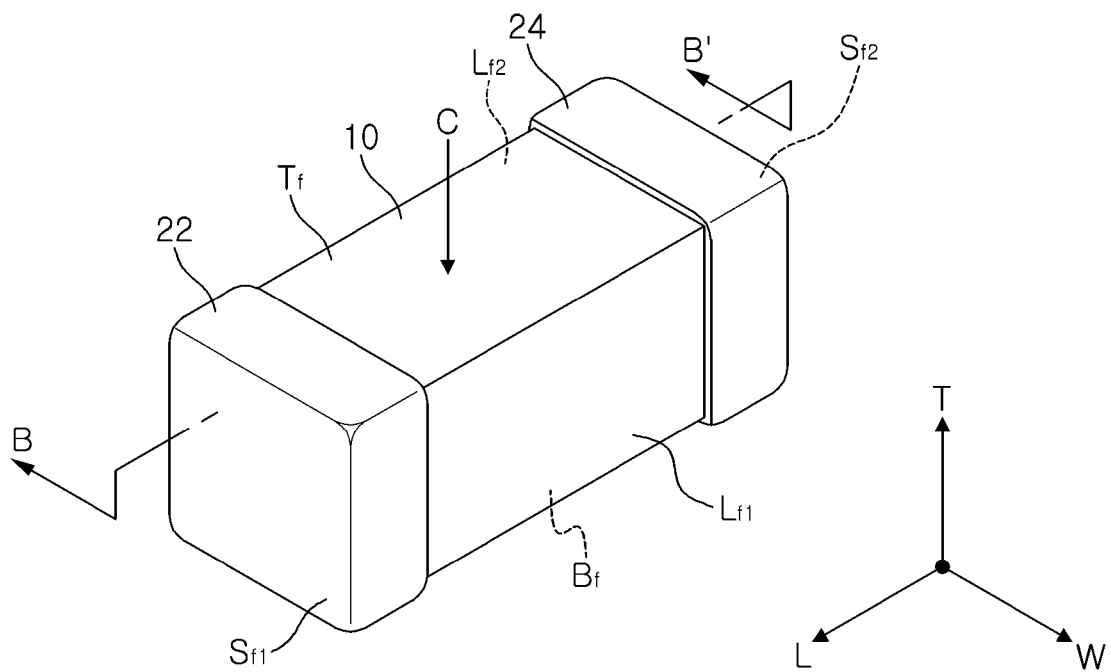
FIG. 1 is a schematic perspective view of a multilayered ceramic capacitor (MLCC) according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic perspective view of a multilayered ceramic capacitor (MLCC) according to an embodiment of the present invention.

Figure 2:
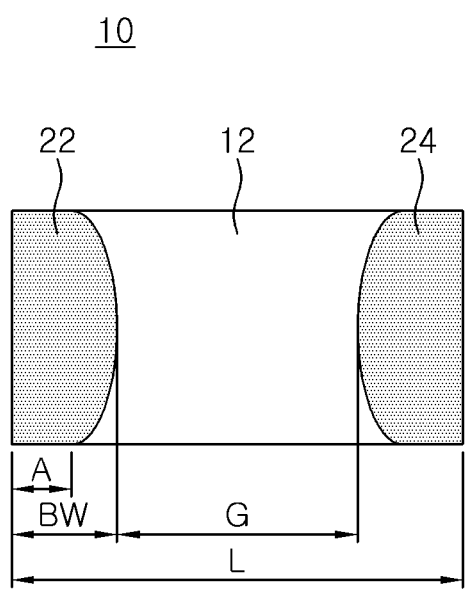
FIG. 2 is a schematic plan view taken in a C direction of FIG. 1.

FIG. 2 is a schematic plan view taken in a C direction of FIG. 1.

Figure 3:
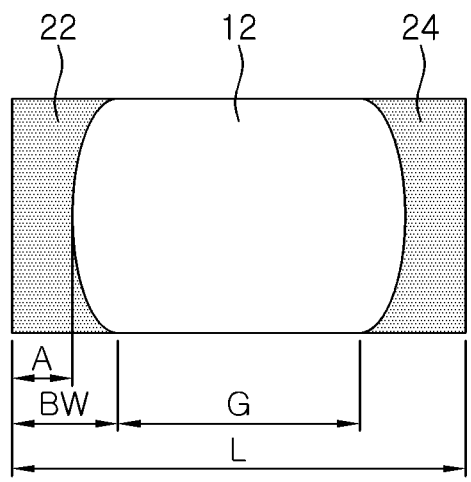
FIG. 3 is a schematic plan view taken in a C direction of FIG. 1 according to another embodiment of the present invention.

FIG. 3 is a schematic plan view taken of the C direction in FIG. 1 according to another embodiment of the present invention.

Figure 4:
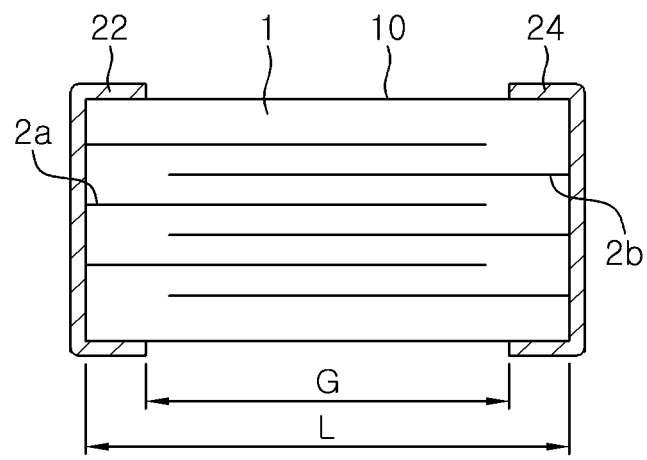
FIG. 4 is a cross-sectional view taken along line B-B' in FIG. 1.

FIG. 4 is a cross-sectional view taken along line B-B' of FIG. 1.

With reference to FIGS. 1, 2, and 4, the multilayered ceramic electronic component according to an embodiment of the present invention may include a ceramic main body 10 having a dielectric layer 1, first and second main faces opposed in a dielectric layer 1 lamination direction, third and fourth end faces connecting the first and second main faces and opposed in a lengthwise direction, and fifth and sixth side faces connecting the first and second main faces and opposed in a widthwise direction, the ceramic main body 10 having a length of 1.79 mm or less and a width of 1.09 mm or less; first and second internal electrodes 2a and 2b disposed to face each other with the dielectric layer 1 interposed therebetween within the ceramic main body 10; and a first external electrode 22 electrically connected to the first internal electrode 2a and a second external electrode 24 electrically connected to the second internal electrode 2b, wherein, when it is defined that the shortest length of at least one of the first and second external electrodes 22 and 24, formed in the lengthwise direction from both end portions of the ceramic main body 10 is A, and the longest length thereof is BW, a relational expression of $0.5 \leq A/BW < 1.0$ may be satisfied.

One end of each of the respective first and second internal electrodes 2a and 2b may be alternately exposed from the third and fourth end faces of the ceramic main body.

When it is defined that the length of the ceramic main body 10 is L and the shortest distance between the first external electrode 22 and the second external electrode 24 is G, a relational expression of $0.75 \leq G/L \leq 0.94$ may be satisfied.

When it is determined that an average thickness of the dielectric layer 1 is td, it may be that $td \geq 10$ μm.

Hereinafter, a multilayered ceramic electronic component according to an embodiment of the present invention will be described, and in this case, a multilayered ceramic capacitor (MLCC) will be taken as an example of the multilayered ceramic electronic component but the present invention is not limited thereto.

The ceramic main body 10 may have a shape of a rectangular parallelepiped. In the present embodiment, it is defined that both surfaces in a lamination direction are a first main face Tf and a second main face Bf, respectively, end surfaces in the lengthwise direction are a third end face Sf1 and a fourth end face Sf2, respectively, and both surfaces in the widthwise direction are a fifth side face Lf1 and a sixth side face Lf2, respectively.

In the multilayered ceramic capacitor (MLCC) according to an embodiment of the present invention, it is defined that a 'lengthwise direction' is the 'L' direction, a 'widthwise direction' is the 'W' direction, and a 'thicknesswise direction' is the 'T' direction in FIG. 1. Here, the 'thicknesswise direction' may be used to have the same concept as a 'lamination direction' in which dielectric layers are piled up (or stacked).

According to an embodiment of the present invention, a raw material for forming the dielectric layers 1 is not particularly limited so long as it can obtain sufficient capacitance. For example, the raw material of the dielectric layers 1 may be barium titanate ($BaTiO_3$).

As for the material of the dielectric layers 1, various materials such as a ceramic additive, an organic solvent, a plasticizer, a bonding agent, a dispersing agent, or the like, may be added to the powder such as barium titanate ($BaTiO_3$), or the like, according to the purpose of the present invention.

A material for forming the first and second internal electrodes 2a and 2b may not be particularly limited. For example, the first and second internal electrodes 2a and 2b may be formed by using a conductive paste formed of a material of one or more among silver (Ag), lead (Pb), platinum (Pt), nickel (Ni), and copper (Cu).

The MLCC according to an embodiment of the present invention may include the first external electrode 22 electrically connected to the first internal electrodes 2a and the second external electrode 24 electrically connected to the second internal electrodes 24.

The first and second external electrodes 22 and 24 may be electrically connected to the first and second internal electrodes 2a and 2b, respectively, to form capacitance, and the second external electrode 24 may be connected to a different potential from that of the first external electrode 22.

Also, the formation positions of the first and second external electrodes 22 and 24 are not particularly limited so long as they may be electrically connected to the first and second internal electrodes 2a and 2b. For example, the first external electrode 22 may be formed on the first and second main faces Tf1 and Tf 2 and the third end face Sf1 of the ceramic main body 10, and the second external electrode 24 may be formed on the first and second main faces Tf1 and Tf2 and the fourth end face Sf2 of the ceramic main body 10.

The first and second external electrodes 22 and 24 may be formed of the same conductive material as that of the internal electrodes, but the present invention is not limited thereto. The first and second external electrodes 22 and 24 may be formed of copper (Cu), silver (Ag), nickel (Ni), or the like.

The first and second external electrodes 22 and 24 may be formed by applying a conductive paste obtained by adding glass frit to metal powder and then firing the same.

Also, the first and second external electrodes 22 and 24 may be, for example, disposed to form an anti-arc gap on one face of the ceramic main body 10, but the present invention is not limited thereto.

With reference to FIG. 2, when it is defined that the shortest length of at least one of the first and second external electrodes 22 and 24, provided in the lengthwise direction from both end portions of the ceramic main body 10 is A, and the longest length thereof is BW, a relational expression of $0.5 \leq A/BW < 1.0$ may be satisfied.

The shortest application length A and the longest application length BW of the first and second external electrodes 22 and 24, formed in the lengthwise direction from both end portions of the ceramic main body 10, may be generated because a paste for external electrode to from the external electrodes partially flows along the ceramic main body 10 before being dried to form the external electrodes, resulting in formation of the external electrodes having an uneven shape.

The external electrodes may have various irregular shapes. For example, the paste for external electrode may flow along the surface of the ceramic main body 10 as shown in FIG. 2, and the paste for external electrode may flow along an edge of the ceramic main body 10 in the lengthwise direction as shown in FIG. 3.

Also, both of the external electrodes may have an irregular shape, or only any one of the external electrodes may have an irregular shape.

The multilayered ceramic capacitor according to an embodiment of the present invention is a high voltage component, and in order to significantly restrain an arc generation, when it is defined that the shortest length of at least one of the first and second external electrodes 22 and 24, provided in the lengthwise direction from both end portions of the ceramic main body 10, is A, and the longest length thereof is BW, a relational expression of $0.5 \leq A/BW < 1.0$ may be satisfied.

Here, the high voltage refers to a voltage band, for example, ranging from 1 KV to 5 KV, but the present invention is not limited thereto, and the multilayered ceramic capacitor according to an embodiment of the present invention may also be applied to a middle voltage of 200 V or higher.

Here, for example, when the ratio of the shortest length A of the first and second external electrodes 22 and 24, provided in the lengthwise direction from both end portions of the ceramic main body 10, to the longest length BW, is less than 0.5, an arc discharge may occur due to a field concentration, and when the ratio is 1.0, the external electrodes may have a shape on which the external electrode paste has not flown, ideally restraining arc discharge.

As the high voltage multilayered ceramic capacitor tends to be reduced in size, there may be a high possibility in which arc is generated between the both terminals of the external electrodes, and in particular, when a product size is a 2012 size or less size, the possibility of arc generation may further increase.

The product size of the multilayered ceramic capacitor according to an embodiment of the present invention is not particularly limited, but in a case in which the product size is a 2012 size or less size, the external electrodes may be adjusted to have a uniform shape, thus significantly restraining an arc generation.

Hereinafter, a method of forming the external electrodes having a uniform shape such that the output electrodes satisfy the relational expression of $0.5 \leq A/BW < 1.0$ when it is defined that the shortest length of at least one of the first and second external electrodes 22 and 24, formed in the lengthwise direction from both end portions of the ceramic main body 10 is A, and the longest length thereof is BW, in order to significantly restrain an arc generation, will be described in detail.

A method of allowing the external electrodes to have a uniform shape according to an embodiment of the present invention is not particularly limited. For example, an organic substance coating film which can be easily eliminated may be used such that the external electrode may have a uniform area by controlling the external electrode to be significantly reduced in the formation of a non-uniform area.

The first and second external electrodes 22 and 24 may be formed by applying a conductive paste prepared by adding glass frit to the metal powder, and by firing the same.

In the method described above, before forming the first and second external electrodes 22 and 24 on the ceramic main body 10, first, an organic substance coating film, which may be easily eliminated, may be formed on the surface of the ceramic main body 10.

Next, the organic substance coating film may be removed from the portions, on which the first and second external electrodes 22 and 24 are to be formed, of the ceramic main body 10.

Then, a conductive paste for external electrode may be applied to the surface of the ceramic main body 10 to form the first and second external electrodes 22 and 24.

Finally, the organic substance coating film may be eliminated from the surface of the ceramic main body 10 on which the first and second external electrodes 22 and 24 are formed, thus eliminating up to a portion on which the conductive paste for external electrode attached on the organic substance coating film flows.

Also, with reference to FIGS. 2 and 3, when it is defined that the length of the ceramic main body 10 is L and the shortest distance between the first external electrode 22 and the second external electrode 24 is G, a relational expression of $0.75 \leq G/L \leq 0.94$ may be satisfied.

In the multilayered ceramic electronic component according to an embodiment of the present invention, in order to significantly restrain an arc generation, the shape of the external electrodes may be controlled to satisfy the relational expression of $0.5 \leq A/BW < 1.0$ and the ratio between the length of the ceramic main body and the shortest distance between the first external electrode 22 and the second external electrode 24 may be controlled, thus further improving an arc generation restraining effect.

In particular, in the multilayered ceramic electronic component according to an embodiment of the present invention, a high pressure product group having a size of 2012 or less which may have a relatively high arc generation possibility may have relatively excellent arc generation restraining effect.

In this manner, when the ratio between length L of the ceramic main body 10 and the shortest distance G between the first external electrode 22 and the second external electrode 24 is controlled to be $0.75 \leq G/L \leq 0.94$, an arc generation may be restrained.

When the ratio between length L of the ceramic main body 10 and the shortest distance G between the first external electrode 22 and the second external electrode 24 is less than 0.75, an arc discharge may occur due to a field concentration, and when the ratio between length L of the ceramic main body 10 and the shortest distance G between the first external electrode 22 and the second external electrode 24 exceeds 0.94, the plating solution may infiltrate into the ceramic main body 10 or the bonding strength of the external electrodes may deteriorate.

One end of each of the respective first and second internal electrodes 2a and 2b may be alternately exposed from the third and fourth end faces Sf1 and Sf2 of the ceramic main body 10.

In the multilayered ceramic capacitor according to an embodiment of the present invention, when it is determined that an average thickness of the dielectric layer 1 is td, it may be that $td \geq 10$ μm.

The average thickness of the dielectric layer 1 may refer to an average thickness of dielectric layers formed between adjacent internal electrodes 2a and 2b.

The average thickness of the dielectric layer 1 may be measured by scanning the image of a section of the ceramic main body 10 in the lengthwise direction by using a scanning electron microscope (SEM) as shown in FIG. 2.

For example, as shown in FIG. 2, the thicknesses of 30 spots of certain dielectric layers, at equal intervals in the lengthwise direction, extracted from an image of the section in the lengthwise and thicknesswise directions (L-T) cut at the central portion of the ceramic main body 10 in the widthwise direction (W), as scanned by the SEM, are measured to obtain an average value.

The measurement value with regard to the 30 spots at the equal intervals may be measured at a capacitance formation portion which refers to an area in which the first and second internal electrodes 2a and 2b overlap.

Also, when the average value of 10 or more dielectric layers is measured, the average thickness of the dielectric layers may be further generalized.

The multilayered ceramic capacitor according to an embodiment of the present invention is a high voltage component. Thus, in order to improve withstand voltage characteristics by increasing a breakdown voltage (BDV), the average thickness td of the dielectric layer 1 may be 10 μm or greater.

Figure 5:
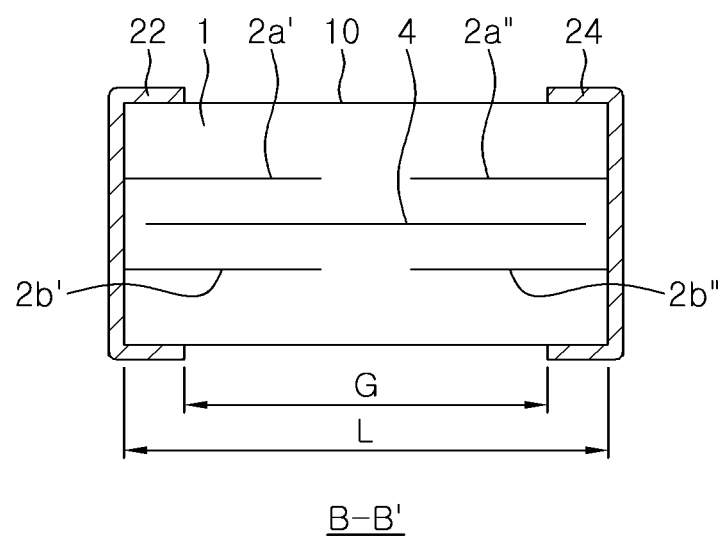
FIG. 5 is a cross-sectional view taken along line B-B' of FIG. 1 according to another embodiment of the present invention.

FIG. 5 is a cross-sectional view taken along line B-B' of FIG. 1 according to another embodiment of the present invention.

With reference to FIG. 5, the ceramic main body 10 may further include one or more floating electrodes 4 formed to have overlap areas with the first and second internal electrodes 2a', 2a" and 2b', 2b" with the dielectric layer interposed therebetween.

According to an embodiment of the present invention, by including the one or more floating electrodes 4 formed to have overlap areas with the first and second internal electrodes 2a', 2a" and 2b', 2b" with the dielectric layer 1 interposed therebetween, field concentration due to a reduction in the thickness of the dielectric layer may be prevented and required withstand voltage performance may be obtained.

A multilayered ceramic electronic component according to another embodiment of the present invention may include a ceramic main body 10 having a plurality of dielectric layers 1 laminated therein, having first and second main faces Tf and Bf opposed in the dielectric layer 1 lamination direction, third and fourth end faces Sf1 and Sf2 connecting the first and second main faces Tf and Bf and opposed in a lengthwise direction, and fifth and sixth side faces Lf1 and Lf2 connecting the first and second main faces Tf and Bf and opposed in a widthwise direction, the ceramic main body 10 having a length of 1.79 mm or less and a width of 1.09 mm or less; a plurality of first and second internal electrodes 2a and 2b disposed to face each other with each of the dielectric layers 1 interposed therebetween within the ceramic main body 10; and a first external electrode 22 electrically connected to the first internal electrodes 2a and a second external electrode 24 electrically connected to the second internal electrodes 2b, wherein, when it is defined that the shortest length of at least one of the first and second external electrodes 22 and 24, formed in the lengthwise direction from both end portions of the ceramic main body 10 is A, and the longest length thereof is BW, a relational expression of $0.5 \leq A/BW < 1.0$ may be satisfied.

The multilayered ceramic electronic component according to another embodiment of the present invention has the same configuration as that of the multilayered ceramic electronic component according to the former embodiment of the present invention as described above, except that the plurality of dielectric layers and the plurality of first and second internal electrode layers are laminated, so a repeated description thereof will be omitted.

One end of each of the respective first and second internal electrodes 2a and 2b may be alternately exposed from the third and fourth end faces Sf1 and Sf2 of the ceramic main body 10.

Also, the multilayered ceramic capacitor may further include one or more floating electrodes 4 formed to have overlap areas with the plurality of first and second internal electrodes 2a', 2a" and 2b', 2b" with the dielectric layer 1 interposed therebetween.

Also, the first and second internal electrodes 2a', 2a" and 2b', 2b" and the floating electrode 4 may be alternately laminated between the dielectric layers 1.

Due to the one or more floating electrodes 4, a plurality of capacitor units connected in series may be formed in the multilayered ceramic capacitor.

Accordingly, a small multilayered ceramic capacitor having large capacity may be implemented, and since the withstand voltage may be increased per unit thickness of the dielectric layer, the high voltage multilayered ceramic capacitor having excellent withstand voltage performance can also be implemented.

When the length of the ceramic main body 10 is defined as L and the shortest distance between the first external electrode 22 and the second external electrode 24 is defined as G, it may be controlled to satisfy $0.75 \leq G/L \leq 0.94$, obtaining excellent arc generation restraining effect as described above.

The present invention will be described in more detail through Examples, but the present invention is not limited thereto.

In the Example, an arc discharge generation voltage of the multilayered ceramic capacitor in which the first and second internal electrodes and the floating electrode are alternately laminated between the dielectric layers and the thickness td of the dielectric layer is 10 μm or greater was tested.

The multilayered ceramic capacitor according to the Example was manufactured through the following process.

First, slurry formed to include powder such as barium titanate ($BaTiO_3$), or the like, was applied to a carrier film and dried to prepare a plurality of ceramic green sheets, thus forming the dielectric layers.

The thickness of the plurality of ceramic green sheets was set such that an average thickness of the dielectric layers was 10 μm after a firing operation.

In order to measure the average thickness of the dielectric layers, an image of the dielectric layers is captured by using an optical microscope and measured by using a measurement program.

Next, a conductive paste for internal electrode including nickel particles having an average size of 0.05 μm to 0.2 μm was prepared.

The conductive paste for internal electrode was applied to the green sheets through screen printing to form internal electrodes, and 50 layers were laminated to form a lamination.

Here, the internal electrodes were manufactured such that a plurality of internal electrodes, each having an end exposed from end faces of the ceramic element in the lengthwise direction of the ceramic main body 10, and one or more floating electrodes formed to have portions overlapping the first and second internal electrodes, are alternately disposed.

Then, the resultant structure was compressed and cut to form a chip having a size (length×width×thickness is 2.0 mm×1.2 mm×1.2 mm) of 2012 standard, and the chip was fired at 1050 1200° C. under a reducing atmosphere of $H_2$ of 0.1% or less.

Thereafter, the chip was subjected to processes such as an external electrode process, a plating process, and the like, so as to be manufactured as a multilayered ceramic capacitor.

Meanwhile, multilayered ceramic capacitors according to Comparative Examples were manufactured. In comparison to the multilayered ceramic capacitor of the Example, the multilayered ceramic capacitors according to Comparative Examples were manufactured in the same manner as that of the Example, except that the ratio of the shortest length A to the longest length BW of the first and second external electrodes 22 and 24, provided in the lengthwise direction from both end portions of the ceramic main body 10, or the ratio between the length L of the ceramic main body 10 and the shortest distance G between the first external electrode 22 and the second external electrode 24 was not within the numerical value range of the present invention.

Table 1 below shows the comparison in arc discharge generation voltage V over the thickness of the dielectric layer of the multilayered ceramic capacitor.

TABLE 1

| | Average thickness of dielectric layer (μm) | Shortest length of external electrode (A) (μm) | Longest length of external electrode (BW) (μm) | Length of ceramic main body (L) (μm) | Shortest distance between external electrodes (G) (μm) | A/BW | A/BW | Arc discharge generation voltage (kV) |
|---|---|---|---|---|---|---|---|---|
| Comparative Example 1 | 6 | 150 | 180 | 2000 | 1640 | 0.83 | 0.82 | Internal damage |
| Comparative Example 2 | 8 | 150 | 180 | 2000 | 1640 | 0.83 | 0.82 | Internal damage |
| Example 1 | 10 | 150 | 180 | 2000 | 1640 | 0.83 | 0.82 | 2440 |

With reference to Table 1, in Comparative Examples 1 and 2, an average thickness of the dielectric layers was less than 10 μm, respectively. Satisfying the numerical value range of the present invention, the average thickness of the dielectric layers were so thin that it does not cause an arc discharge, but the interior of the dielectric layers may be damaged.

In Comparative Example 3, an average thickness of the dielectric layers was 10 μm or greater. It is noted that when the numerical value range of the present invention is satisfied, the arc discharge generation voltage is relatively high such that the breakdown voltage characteristics may be improved.

Thus, it is noted that the multilayered ceramic electronic component according to the Example of the present invention can have improved breakdown voltage characteristics due to the high arc discharge generation voltage when the average thickness of the dielectric layers 1 after a firing operation is 10 μm or greater as described hereinafter.

Table 2 below shows the comparison in arc discharge generation voltage V over the size of the multilayered ceramic capacitor.

With reference to Table 2, Comparative Example 4 shows a chip having a size of 2012 standard. It is noted that when the ratio of the shortest length A to the longest length of the first and second external electrodes 22 and 24, formed in the lengthwise direction from both end portions of the ceramic main body 10, or the ratio between the length L of the ceramic main body 10 and the shortest distance G between the first external electrode 22 and the second external electrode 24 was not within the numerical value range of the present invention, an arc discharge generation voltage is so low, causing a problem.

Meanwhile, Comparative Examples 5 and 6 show a chip having a size of 3216 standard and a chip having a size of 4532 standard, respectively. It is noted that although the ratio of the shortest length A to the longest length BW of the first and second external electrodes 22 and 24, formed in the lengthwise direction from both end portions of the ceramic main body 10, or the ratio between the length L of the ceramic main body 10 and the shortest distance G between the first external electrode 22 and the second external electrode 24 was not within the numerical value range of the present invention, since the arc discharge generation voltage is so high that there is no problem.

Thus, it is noted that when the multilayered ceramic electronic component according to the Example of the present invention has the size of 2012 standard or less, the arc discharge generation voltage is so high as to be effective.

Table 3 below shows the comparison in arc discharge generation voltage V over the ratio of the longest length BW of the first and second external electrodes 22 and 24, formed in the lengthwise direction from both end portions of the ceramic main body 10, the length L of the ceramic main body 10 and the shortest distance G between the first external electrode and the second external electrode in the chip having the size of 2012 standard.

TABLE 2

| No | Shortest length of external electrode (μm) | Longest length of external electrode (BW) (μm) | Length of ceramic main body (L) (μm) | Shortest distance between external electrodes (G) (μm) | A/BW | G/L | Arc discharge generation voltage (V) | Note |
|---|---|---|---|---|---|---|---|---|
| Comparative Example 3 | 300 | 360 | 2000 | 1280 | 0.8 | 0.6 | 1840 | Arc discharge |
| Comparative Example 4 | 400 | 480 | 3200 | 2240 | 0.8 | 0.7 | 3350 | |
| Comparative Example 5 | 500 | 600 | 4500 | 3300 | 0.8 | 0.7 | 4930 | |

TABLE 3

| No | Longest length of external electrode (BW) (μm) | Length of ceramic main body (L) (μm) | Shortest distance between external electrodes (G) (μm) | G/L | Arc discharge generation voltage (V) | Note |
| --- | --- | --- | --- | --- | --- | --- |
| Comparative Example 6 | 20 | 2000 | 1960 | 0.98 | 2950 | Generation of defective moisture-proof |
| Comparative Example 7 | 30 | 2000 | 1940 | 0.97 | 2915 | Generation of defective moisture-proof |
| Comparative Example 8 | 40 | 2000 | 1920 | 0.96 | 2880 | Generation of defective moisture-proof |
| Example 2 | 60 | 2000 | 1880 | 0.94 | 2830 | |
| Example 3 | 80 | 2000 | 1840 | 0.92 | 2755 | |
| Example 4 | 100 | 2000 | 1800 | 0.90 | 2690 | |
| Example 5 | 120 | 2000 | 1760 | 0.88 | 2640 | |
| Example 6 | 150 | 2000 | 1700 | 0.85 | 2530 | |
| Example 7 | 200 | 2000 | 1600 | 0.80 | 2360 | |
| Example 8 | 250 | 2000 | 1500 | 0.75 | 2215 | |
| Comparative Example 9 | 300 | 2000 | 1400 | 0.70 | 1985 | Arc discharge |
| Comparative Example 10 | 350 | 2000 | 1300 | 0.65 | 1875 | Arc discharge |
| Comparative Example 11 | 400 | 2000 | 1200 | 0.60 | 1790 | Arc discharge |
| Comparative Example 12 | 450 | 2000 | 1100 | 0.55 | 1630 | Arc discharge |

As noted in Table 3, in case of Examples 2 to 8 in which the ratio between the length L of the ceramic main body and the shortest distance G between the first and second external electrodes satisfies the numerical value range of 0.75 to 0.94, arc discharge generation voltage V is 2250V or higher, preventing an arc generation.

Meanwhile, in case of Comparative Examples 7 to 10, the ratio between the length L of the ceramic main body and the shortest distance G between the first and second external electrodes is less than 0.75 or exceeds 0.94. When the ratio is less than 0.75, an arc discharge generation voltage is so low, causing a problem, and when the ratio exceeds 0.94, a plating solution infiltrates into the ceramic main body, having a high possibility of defective moisture-proof.

To conclude, according to an embodiment of the present invention, when the ratio of the shortest length A to the longest length BW of the first and second external electrodes 22 and 24, formed in the lengthwise direction from both end portions of the ceramic main body 10 satisfies $0.5 \leq A/BW < 1.0$, the arc discharge generation voltage V is increased, so the high voltage multilayered ceramic electronic component capable of significantly restraining an arc generation may be implemented.

In addition, when the ratio between the length L of the ceramic main body 10 and the shortest distance G between the first external electrode and the second external electrode satisfies $0.75 \leq G/L \leq 0.94$, the arc discharge generation voltage kV may be further increased, so the high voltage multilayered ceramic electronic component capable of significantly restraining an arc generation may be implemented.

As set forth above, according to embodiments of the invention, a high voltage multilayered ceramic electronic component in which an arc generation may be significantly restrained may be implemented by forming external electrodes such that the external electrodes have a uniform shape.

While the present invention has been shown and described in connection with the embodiments, it will be apparent to those skilled in the art that modifications and variations may be made without departing from the spirit and scope of the invention as defined by the appended claims.

What is claimed is:

1. A multilayered ceramic electronic component comprising:
    a ceramic main body including a dielectric layer, first and second main faces opposed in a dielectric layer lamination direction, third and fourth end faces connecting the first and second main faces and opposed in a lengthwise direction, and fifth and sixth side faces connecting the first and second main faces and opposed in a widthwise direction, the ceramic main body having a length of 1.79 mm or less and a width of 1.09 mm or less;
    first and second internal electrodes disposed to face each other with the dielectric layer interposed therebetween within the ceramic main body; and
    a first external electrode electrically connected to the first internal electrode and a second external electrode electrically connected to the second internal electrode,
    wherein, when it is defined that a shortest length of at least one of the first and second external electrodes, formed in the lengthwise direction from both end portions of the ceramic main body is A, and a longest length thereof is BW, a relational expression of $0.5 \leq A/BW < 1.0$ is satisfied.

2. The multilayered ceramic electronic component of claim 1, wherein the end of each of the respective first and second internal electrodes is alternately exposed from the third and fourth end faces of the ceramic main body.

3. The multilayered ceramic electronic component of claim 1, wherein the ceramic main body further includes one or more floating electrodes formed to have an overlap area with the first and second internal electrodes, with the dielectric layer interposed therebetween.

4. The multilayered ceramic electronic component of claim 1, wherein when it is defined that the length of the ceramic main body is L and the shortest distance between the first external electrode and the second external electrode is G, a relational expression of $0.75 \leq G/L \leq 0.94$ is satisfied.

5. The multilayered ceramic electronic component of claim 1, wherein when it is determined that an average thickness of the dielectric layer is td, $td \geq 10$ μm.

6. A multilayered ceramic electronic component comprising:
- a ceramic main body including a plurality of dielectric layers laminated therein, first and second main faces opposed in a dielectric layer lamination direction, third and fourth end faces connecting the first and second main faces and opposed in a lengthwise direction, and fifth and sixth side faces connecting the first and second main faces and opposed in a widthwise direction, the ceramic main body having a length of 1.79 mm or less and a width of 1.09 mm or less;
- a plurality of first and second internal electrodes disposed to face each other with each of the dielectric layers interposed therebetween within the ceramic main body; and
- a first external electrode electrically connected to the first internal electrode and a second external electrode electrically connected to the second internal electrode,
wherein, when it is defined that a shortest length of at least one of the first and second external electrodes, formed in the lengthwise direction from both end portions of the ceramic main body is A, and a longest length thereof is BW, a relational expression of $0.5 \leq A/BW < 1.0$ is satisfied.

7. The multilayered ceramic electronic component of claim 6, wherein one end of each of the plurality of first and second internal electrodes is alternately exposed from the third and fourth end faces of the ceramic main body.

8. The multilayered ceramic electronic component of claim 6, wherein the ceramic main body further includes one or more floating electrodes formed to have an overlap area with the first and second internal electrodes, with the dielectric layers interposed therebetween, and the first and second internal electrodes and the floating electrode are alternately laminated between the dielectric layers.

9. The multilayered ceramic electronic component of claim 6, wherein when it is defined that the length of the ceramic main body is L and the shortest distance between the first external electrode and the second external electrode is G, a relational expression of $0.75 \leq G/L \leq 0.94$ is satisfied.

10. The multilayered ceramic electronic component of claim 6, wherein when it is determined that an average thickness of the dielectric layers is td, $td \geq 10$ μm.

* * * * *